(12) United States Patent
Yang

(10) Patent No.: US 7,833,120 B2
(45) Date of Patent: Nov. 16, 2010

(54) AUTOMATIC TRANSMISSION FOR VEHICLES

(75) Inventor: Sang Suk Yang, Suwon (KR)

(73) Assignee: Hyundai Motor Company, Seoul (KR)

( * ) Notice: Subject to any disclaimer, the term of this patent is extended or adjusted under 35 U.S.C. 154(b) by 287 days.

(21) Appl. No.: 12/143,417

(22) Filed: Jun. 20, 2008

(65) Prior Publication Data

US 2009/0156348 A1    Jun. 18, 2009

(30) Foreign Application Priority Data

Dec. 17, 2007    (KR)    ...................... 10-2007-0132081

(51) Int. Cl.
*F16H 37/02*    (2006.01)
(52) U.S. Cl. ..................................... 475/209
(58) Field of Classification Search ................. 475/207, 475/209
See application file for complete search history.

(56) References Cited

U.S. PATENT DOCUMENTS

| | | | |
|---|---|---|---|
| 4,200,006 A * | 4/1980 | Ehrlinger et al. ............ | 475/219 |
| 6,190,280 B1 * | 2/2001 | Horsch ........................ | 475/209 |
| 6,845,682 B1 * | 1/2005 | Bulgrien ...................... | 74/331 |
| 6,893,373 B2 * | 5/2005 | Kawamoto et al. .......... | 475/302 |
| 7,097,584 B2 * | 8/2006 | Kuhstrebe .................... | 475/218 |
| 7,344,471 B2 * | 3/2008 | Sugino et al. ................ | 475/318 |
| 2005/0176547 A1 * | 8/2005 | DeFreitas .................... | 475/207 |
| 2009/0156349 A1 * | 6/2009 | Yang ........................... | 475/218 |

* cited by examiner

*Primary Examiner*—Dirk Wright
(74) *Attorney, Agent, or Firm*—Morgan, Lewis & Bockius LLP

(57) ABSTRACT

The present invention relates to an automatic transmission for vehicles, whose weight, length, and manufacturing cost are reduced as a consequence of simplifying a structure thereof by removing a torque converter. An automatic transmission for vehicles according to an exemplary embodiment of the present invention may include a first shift portion outputting two intermediate rotational speeds of a reduced rotational speed and a same rotational speed by using torque received through a first variable input pathway selectively connected to a first input shaft and an input pathway fixedly connected to the first input shaft, and a second shift portion including first, second, third, and fourth gears and a reverse gear that respectively achieve first, second, third, and fourth gear ratios and a reverse gear ratio, changing each intermediate rotational speed received from the first shift portion into five final rotational speeds, and outputting the same.

16 Claims, 3 Drawing Sheets

FIG.3

|  | C1 | C2 | C3 | B1 | SYN1 | SYN2 | SYN3 |
|---|---|---|---|---|---|---|---|
| Neutral |  |  |  | ● |  |  |  |
| F1 |  |  | ● | ● | SL11 |  |  |
| F2 |  | ● |  | ● | SL12 |  |  |
| F3 |  |  | ● | ● |  | SL21 |  |
| F4 |  | ● |  | ● |  | SL22 |  |
| F5 | ● |  | ● |  | SL11 |  |  |
| F6 | ● | ● |  |  | SL12 |  |  |
| F7 | ● |  | ● |  |  | SL21 |  |
| F8 | ● | ● |  |  |  | SL22 |  |
| REV1 |  | ● |  | ● |  |  | ● |
| REV2 | ● | ● |  |  |  |  | ● |

AUTOMATIC TRANSMISSION FOR VEHICLES

CROSS-REFERENCE TO RELATED APPLICATION

This application claims priority to and the benefit of Korean Patent Application No. 10-2007-0132081 filed in the Korean Intellectual Property Office on Dec. 17, 2007, the entire contents of which are incorporated herein by reference.

BACKGROUND OF THE INVENTION (a) Field of the Invention

The present invention relates to an automatic transmission for vehicles that achieves eight forward speeds and two reverse speeds. More particularly, the present invention relates to an automatic transmission for vehicles, whose weight, length, and manufacturing cost are reduced as a consequence of simplifying a structure thereof by removing a torque converter.

(b) Description of the Related Art

A transmission of a vehicle is disposed between an engine and a drive shaft. The transmission converts engine torque into torque and speed suitable for a running state of the vehicle, and transmits the torque and speed to a driving wheel.

That is, the transmission achieves a neutral state so as to enable the engine to be started, forward speeds by suitably changing the driving torque of the engine so as to enable the vehicle to move forwardly, and reverse speeds by suitably changing the driving torque of the engine so as to enable the vehicle to move backwardly.

The transmission for vehicles is divided largely into a manual transmission where a driver directly performs a shifting action, and an automatic transmission where a detecting means disposed at a preferable position in the vehicle detects the driving state of the vehicle and a transmission control unit (TCU) automatically performs the shifting action based on the driving state. The present invention relates to an automatic transmission.

Generally, an automatic transmission for vehicles includes a torque converter, a power train connected to the torque converter and achieving a plurality of gear ratios, and a hydraulic control system selectively operating operation members of the power train according to the driving state of the vehicle.

The automatic transmission also includes a compound planetary gear set formed by combining at least two simple planetary gear sets to achieve the required multiple speeds. The power train includes a plurality of frictional members, and the hydraulic control system selectively operates the frictional members of the power train according to the driving condition.

A variety of such power trains and hydraulic control systems have been developed by vehicle manufacturers according to their own schemes. ☐

Currently, four-speed and five-speed automatic transmissions are most often found on the market. However, six-speed automatic transmissions have also been realized for enhancement of performance of power transmission and for enhanced fuel mileage of a vehicle.

In spite of excellent merits, the automatic transmission has disadvantages in efficiency. Recently, automatic transmissions that have the excellent efficiency of a manual transmission as well as the convenience of an automatic transmission are under investigation through using a plurality of frictional members (i.e., clutches and brakes) and shift automation means mounted at a conventional manual transmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an automatic transmission for vehicles having advantages of the excellent efficiency of a manual transmission as well as the convenience of an automatic transmission through using a plurality of frictional members and shift automation means mounted at a conventional manual transmission and simple planetary gear sets.

An automatic transmission for vehicles according to an exemplary embodiment of the present invention may include a first shift portion outputting two intermediate rotational speeds of a reduced rotational speed and a same rotational speed as an input rotational speed by using torque received through a first variable input pathway selectively connected to a first input shaft and an input pathway fixedly connected to the first input shaft, and a second shift portion including first, second, third, and fourth gears and a reverse gear that respectively achieve first, second, third, and fourth gear ratios and a reverse gear ratio, changing each intermediate rotational speed received from the first shift portion into five final rotational speeds, and outputting the same.

The first shift portion may include first, second, and third operating members, wherein the first operating member receives the torque through the input pathway fixedly connected to the first input shaft, the second operating member is selectively stopped, and the third operating member receives the torque through the first variable input pathway selectively connected to the first input shaft and always operates as an output member.

The first shift portion may be a planetary gear set provided with a sun gear, a planet carrier, and a ring gear as operating members thereof, wherein the sun gear is operated as the first operating member, the ring gear is operated as the second operating member, and the planet carrier is operated as the third operating member.

The first shift portion may further include a first clutch selectively transmitting the torque to the third operating member through the first variable input pathway; and a first brake selectively stopping the second operating member.

The intermediate rotational speeds of the first shift portion may be selectively transmitted to the second shift portion through second and third variable input pathways.

The second shift portion may include a second input shaft receiving the intermediate rotational speeds of the first shift portion through the second variable input pathway, a third input shaft disposed concentrically with the second input shaft and receiving the intermediate rotational speeds of the first shift portion through the third variable input pathway, a first intermediate shaft disposed in parallel with the second and third input shaft and selectively connected to the second and third input shafts so as to achieve the first and second gear ratios, and a second intermediate shaft disposed in parallel with the second and third input shafts and selectively connected to the second and third input shafts so as to achieve the third and fourth gear ratios.

One of the first and second intermediate shafts may be selectively connected to the second input shaft so as to achieve the reverse gear ratio.

A first synchronizer provided with the first and second gears may be disposed on the first intermediate shaft, and a second synchronizer provided with the third and fourth gears may be disposed on the second intermediate shaft.

A third synchronizer provided with the reverse gear may be disposed on one of the first and second intermediate shafts.

The third input shaft may be provided with a first input gear integrally formed thereto, and the second input shaft may be provided with a second input gear integrally formed thereto, wherein the first input gear is engaged with the first and third gears, and the second input gear is engaged with the second and fourth gears.

The second shift portion may further include an idle gear, and the second input shaft may further include a third input gear integrally formed thereto, wherein the idle gear is engaged with the third input gear and the reverse gear.

The first synchronizer may include a first sleeve selectively connecting the first gear with the first intermediate shaft, and a second sleeve selectively connecting the second gear with the first intermediate shaft.

The second synchronizer may include a third sleeve selectively connecting the third gear with the second intermediate shaft, and a fourth sleeve selectively connecting the fourth gear with the second intermediate shaft.

The third synchronizer may selectively connect the reverse gear with one of the first and second intermediate shafts.

The second shift portion may further include a first transfer drive gear integrally formed with the first intermediate shaft, a second transfer drive gear integrally formed with the second intermediate shaft, and a transfer driven gear engaged with the first and second transfer drive gears and outputting a final rotational speed.

The automatic transmission may further include a second clutch selectively transmitting the intermediate rotational speed of the first shift portion to the second shift portion through the second variable input pathway, and a third clutch selectively transmitting the intermediate rotational speed of the first shift portion to the second shift portion through the third variable input pathway.

The first, second, and third clutches, and the first brake may be disposed at an exterior portion of the first shift portion.

BRIEF DESCRIPTION OF THE DRAWINGS

FIG. 3 is an operational chart for an automatic transmission for vehicles according to an exemplary embodiment of the present invention.

DETAILED DESCRIPTION OF THE EMBODIMENTS

Hereinafter, an exemplary embodiment of the present invention will be described in detail with reference to the accompanying drawings.

Figure 1:
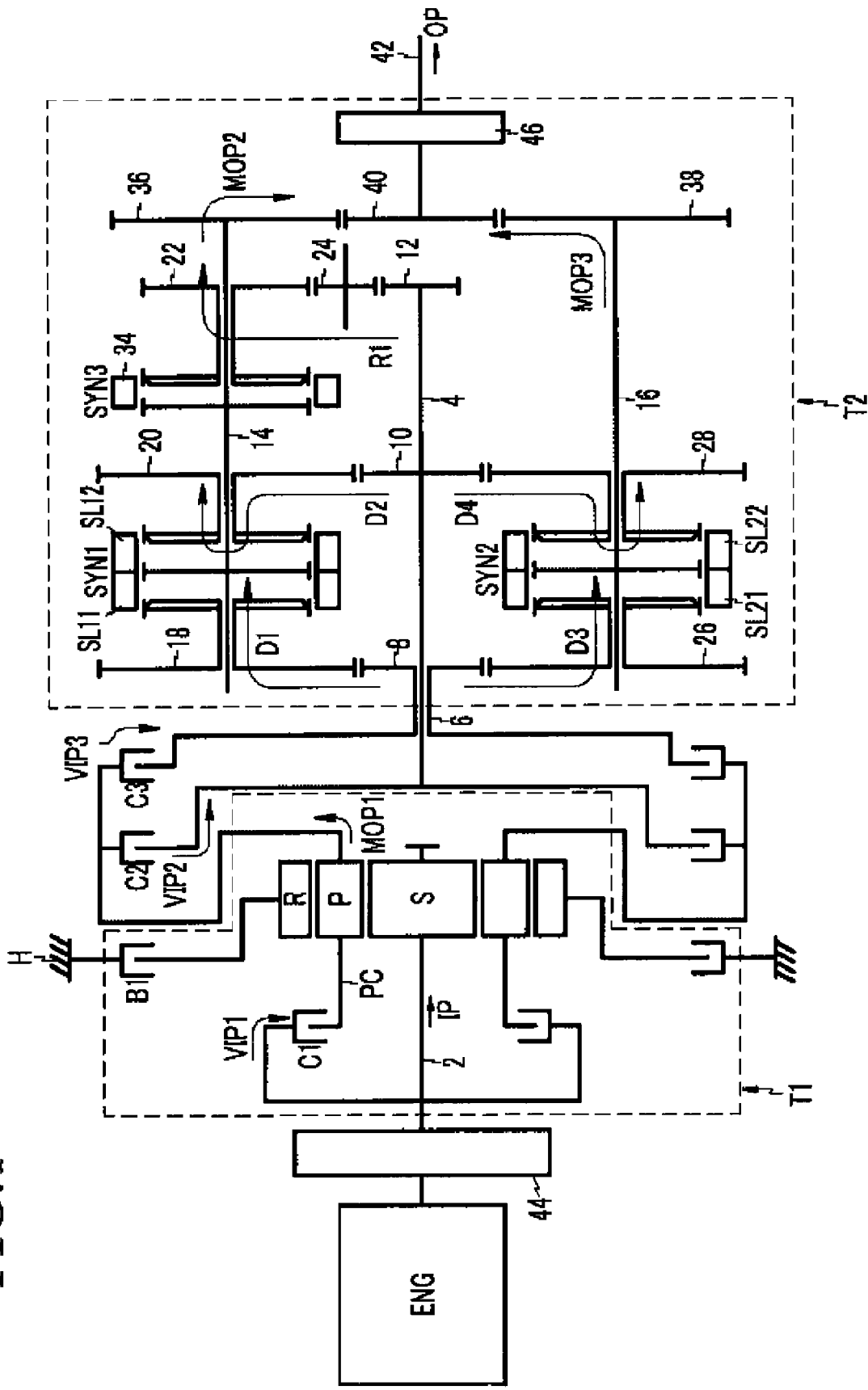
FIG. 1 is a schematic diagram of an automatic transmission for vehicles according to an exemplary embodiment of the present invention.

FIG. 1 is a schematic diagram of an automatic transmission for vehicles according to an exemplary embodiment of the present invention.

An automatic transmission according to an exemplary embodiment of the present invention includes a first shift portion T1 outputting intermediate rotational speeds of two forward speeds, and a second shift portion T2 changing each intermediate rotational speed received from the first shift portion T1 into five final rotational speeds and outputting the same.

The first shift portion T1 is a single pinion planetary gear set, and includes a sun gear S disposed at a middle portion thereof a planet carrier PC supporting a plurality of pinions P that are engaged with the sun gear S, and a ring gear R engaged with the plurality of pinions P.

The sun gear S is fixedly connected to a first input shaft 2 that receives an output of an engine ENG and receives torque through an input pathway IP.

The planet carrier PC is selectively connected to the first input shaft 2 by interposing a first clutch C1 that is a frictional member, and selectively receives the torque through a first variable input pathway VIP1. In addition, the planet carrier PC is fixedly connected to a first intermediate output pathway MOP1 and is always operated as an output member.

The ring gear R is selectively connected to a transmission housing H by interposing a first brake B1 that is a frictional member, and is selectively operated as a fixed member.

Therefore, if the first brake B1 is operated in a state that the torque is always input to the sun gear S of the first shift portion T1 through the input pathway IP, a reduced rotational speed that is slower than an input rotational speed is output through the first intermediate output pathway MOP1 connected to the planet carrier PC.

In addition, if the first clutch C1 is operated, the torque of the first input shaft 2 is input to the sun gear S through the input pathway IP and is input to the planet carrier PC through the first variable input pathway VIP1. Therefore, all operating members of the first shift portion T1 become in a lock state and a rotational speed that is the same as the input rotational speed is output through the first intermediate output pathway MOP1.

The second shift portion T2 changes two intermediate rotational speeds of the first shift portion T1 received through second and third variable input pathways VIP2 and VIP3 respectively into five final rotational speeds, and outputs the same through a final output pathway OP.

For this purpose, the second shift portion T2 includes a plurality of gears and synchronizers achieving a plurality of gear ratios disposed on a plurality of shafts, similar to a conventional manual transmission.

The second shift portion T2 includes second and third input shafts 4 and 6 and first and second intermediate shafts 14 and 16.

The second input shaft 4 is disposed coaxially with the first input shaft 2, and the third input shaft 6 is disposed concentrically with the second input shaft 4.

The second input shaft 4 is connected to the first intermediate output pathway MOP1 of the first shift portion T1 by interposing a second clutch C2 that is a frictional member, and selectively receives the intermediate rotational speeds of the first shift portion T1 through the second variable input pathway VIP2.

The third input shaft 6 is connected to the first intermediate output pathway MOP1 of the first shift portion T1 by interposing a third clutch C3 that is a frictional member, and selectively receives the intermediate rotational speeds of the first shift portion T1 through the third variable input pathway VIP3.

Therefore, the torque output from the first shift portion T1 is input to the second input shaft 4 through the second variable input pathway VIP2 if the second clutch C2 is operated, and the torque output from the first shift portion T1 is input to the third input shaft 6 through the third variable input pathway VIP3 if the third clutch C3 is operated.

A first input gear 8 is integrally formed with a rear portion of the third input shaft 6, and second and third input gears 10 and 12 are integrally formed with the second input shaft 4.

The first and second intermediate shafts 14 and 16 are disposed in parallel with and respectively apart by a predetermined distance from the second input shaft 4. First, second, and reverse gears 18, 20, and 22 engaged respectively with the first, second, and third input gears 8, 10, and 12 are rotatably disposed on the first intermediate shaft 14. The reverse gear 22 is indirectly engaged with the third input gear 12 through an idle gear 24.

Third and fourth gears 26 and 28 engaged respectively with the first and second input gears 8 and 10 are rotatably disposed on the second intermediate shaft 16.

A first synchronizer SYN1 is disposed between the first and second gears 18 and 20, a second synchronizer SYN2 is disposed between the third and fourth gears 26 and 28, and a third synchronizer SYN3 is disposed in front of the reverse gear 22.

The first synchronizer SYN1 includes two sleeves SL11 and SL12. If the first sleeve SL11 of the first synchronizer SYN1 is operated, the first intermediate shaft 14 is connected to the first gear 18. On the contrary, if the second sleeve SL12 is operated, the first intermediate shaft 14 is connected to the second gear 20.

The second synchronizer SYN2 includes two sleeves SL21 and SL22. If the third sleeve SL21 is operated, the second intermediate shaft 16 is connected to the third gear 26. On the contrary, if the fourth sleeve SL22 is operated, the second intermediate shaft 16 is connected to the fourth gear 28.

The third synchronizer SYN3 includes one sleeve 34, and the first intermediate shaft 14 is connected to the reverse gear 22 if the fifth sleeve 34 is operated.

The first input gear 8, the first gear 18, and the first sleeve SL11 of the first synchronizer SYN1 form a first shift pathway D1 since the first gear 18 is engaged with the first input gear 8, and the second input gear 10, the second gear 20, and the second sleeve SL12 of the first synchronizer SYN1 form a second shift pathway D2 since the second gear 20 is engaged with the second input gear 10.

In addition, the first input gear 8, the third gear 26, and the third sleeve SL21 of the second synchronizer SYN2 form a third shift pathway D3 since the third gear 26 is engaged with the first input gear 8, and the second input gear 10, the fourth gear 28, and the fourth sleeve SL22 of the second synchronizer SYN2 form a fourth shift pathway D4 since the fourth gear 28 is engaged with the second input gear 10.

Further, the third input gear 12, the idle gear 24, the reverse gear 22, and the third synchronizer SYN3 from a reverse shift pathway R1.

First and second transfer drive gears 36 and 38 are disposed respectively on rear portions of the first and second intermediate shafts 14 and 16, and a transfer driven gear 40 connected to an output shaft 42 is engaged with the first and second transfer drive gears 36 and 38.

Accordingly, the first transfer drive gear 36 and the transfer driven gear 40 form a second intermediate output pathway MOP2, and the second transfer drive gear 38 and the transfer driven gear 40 form a third intermediate output pathway MOP3. The torque output through the second and third intermediate output pathways MOP2 and MOP3 is transmitted to a differential apparatus (not shown) through a final output pathway OP, and drives a driving wheel.

Actuators (not shown) driving respective sleeves SL11, SL12, SL21, SL22, and 34 used in the first, second, and third synchronizers SYN1, SYN2, and SYN3 are driven by a transmission control unit.

The actuators may be driven by using an electric motor or be driven by receiving hydraulic pressure from a hydraulic control system. Structures and driving methods of such actuators are well known to a person of an ordinary skill in the art, and thus, a detailed description will be omitted.

Un-described reference numerals 44 and 46 in FIG. 1 represent a hydraulic pump and a parking device, respectively.

Figure 2:
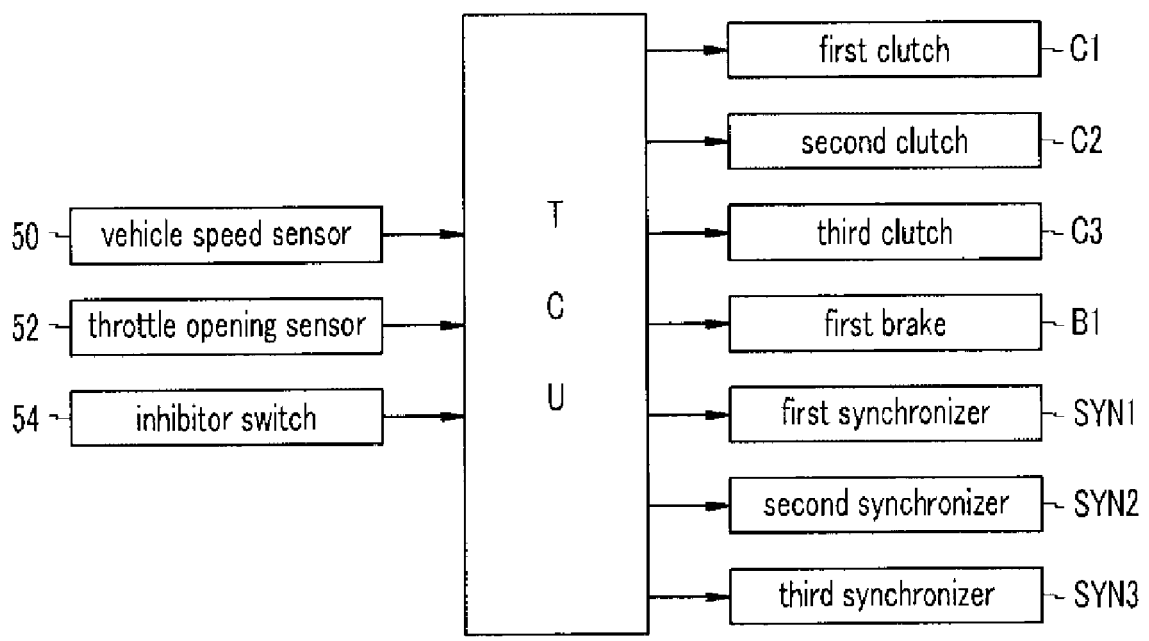
FIG. 2 is a block diagram of a system for operating an automatic transmission for vehicles according to an exemplary embodiment of the present invention.

FIG. 2 is a block diagram of a system for operating an automatic transmission for vehicles according to an exemplary embodiment of the present invention.

As shown in FIG. 2, a system for operating an automatic transmission for vehicles according to an exemplary embodiment of the present invention includes a vehicle speed sensor 50 detecting a vehicle speed, a throttle opening sensor 52 detecting a throttle opening, an inhibitor switch 54 detecting a shift range, and a transmission control unit TCU analyzing information received from respective sensors 50 and 52 and the inhibitor switch 54 and controlling the first, second, and third clutches C1, C2, and C3, the first brake B1, and the first, second, and third synchronizers SYN1, SYN2, and SYN3.

Meanwhile, the first, second, and third clutches C1, C2, and C3 and the first brake B1 may be disposed at an exterior portion of the first shift portion T1.

If the frictional members are disposed at the exterior portion of the first shift portion T1, length of the transmission may be reduced and frictional heat generated at the frictional members is efficiently emitted to the exterior of the transmission housing H.

In addition, operational pressure of the frictional members provided with a plurality of wet friction disks includes supply pressure and centrifugal pressure. If radii of the frictional members become increased, the centrifugal pressure also becomes increased. Therefore, the supply pressure supplied to the frictional members may be reduced and accordingly capacity of the hydraulic pump may also be reduced.

FIG. 3 is an operational chart for an automatic transmission for vehicles according to an exemplary embodiment of the present invention.

The first brake B1, the third clutch C3, and the first sleeve SL11 of the first synchronizer SYN1 are operated at a first forward speed F1, the first brake B1, the second clutch C2, and the second sleeve SL12 of the first synchronizer SYN1 are operated at a second forward speed F2, the first brake B1, the third clutch C3, and the third sleeve SL21 of the second synchronizer SYN2 are operated at a third forward speed F3, and the first brake B1, the second clutch C2, and the fourth sleeve SL22 of the second synchronizer SYN2 are operated at a fourth forward speed F4.

The first clutch C1, the third clutch C3, and the first sleeve SL11 of the first synchronizer SYN1 are operated at a fifth forward speed F5, the first clutch C1, the second clutch C2, and the second sleeve SL12 of the first synchronizer SYN1 are operated at a sixth forward speed F6, the first clutch C1, the third clutch C3, and the third sleeve SL21 of the second synchronizer SYN2 are operated at a seventh forward speed F7, and the first clutch C1, the second clutch C2, and the fourth sleeve SL22 of the second synchronizer SYN2 are operated at an eighth forward speed F8.

The second clutch C2, the first brake B1, and the third synchronizer SYN3 are operated at a first reverse speed REV1, and the first clutch C1, the second clutch C2, and the third synchronizer SYN3 are operated at a second reverse speed REV2.

Shifting processes in an automatic transmission for vehicles according to an exemplary embodiment of the present invention will now be described in detail.

First Forward Speed

At the first forward speed F1, the transmission control unit TCU operates the third clutch C3, the first brake B1, and the first sleeve SL11 of the first synchronizer SYN1.

In this case, an input rotational speed input through the input pathway IP is reduced by an operation of the first brake B1 and the reduced rotational speed is output through the first intermediate output pathway MOP1.

In addition, the reduced rotational speed of the first intermediate output pathway MOP1 is input to the second shift portion T2 through the third variable input pathway VIP3 by an operation of the third clutch C3. The first sleeve SL11 of the first synchronizer SYN1 connects the third variable input pathway VIP3 to the first shift pathway D1, and the first forward speed F1 is achieved.

The first forward speed F1 is output through the second intermediate output pathway MOP2 and the final output pathway OP.

Second Forward Speed

If the vehicle speed increases in a state of the first forward speed F1, the transmission control unit TCU releases the third clutch C3 and the first sleeve SL11 of the first synchronizer SYN1 and operates the second clutch C2 and the second sleeve SL12 of the first synchronizer SYN1.

In this case, an input rotational speed input through the input pathway IP is reduced by an operation of the first brake B1 and the reduced rotational speed is output through the first intermediate output pathway MOP1.

In addition, the reduced rotational speed of the first intermediate output pathway MOP1 is input to the second shift portion T2 through the second variable input pathway VIP2 by an operation of the second clutch C2. The second sleeve SL12 of the first synchronizer SYN1 connects the second variable input pathway VIP2 to the second shift pathway D2, and the second forward speed F2 is achieved.

The second forward speed F2 is output through the second intermediate output pathway MOP2 and the final output pathway OP.

Third Forward Speed

If the vehicle speed increases in a state of the second forward speed F2, the transmission control unit TCU releases the second clutch C2 and the second sleeve SL12 of the first synchronizer SYN1 and operates the third clutch C3 and the third sleeve SL21 of the second synchronizer SYN2.

In this case, an input rotational speed input through the input pathway IP is reduced by an operation of the first brake B1 and the reduced rotational speed is output through the first intermediate output pathway MOP1.

In addition, the reduced rotational speed of the first intermediate output pathway MOP1 is input to the second shift portion T2 through the third variable input pathway VIP3 by an operation of the third clutch C3. The third sleeve SL21 of the second synchronizer SYN2 connects the third variable input pathway VIP3 to the third shift pathway D3, and the third forward speed F3 is achieved.

The third forward speed F3 is output through the third intermediate output pathway MOP3 and the final output pathway OP.

Fourth Forward Speed

If the vehicle speed increases in a state of the third forward speed F3, the transmission control unit TCU releases the third clutch C3 and the third sleeve SL21 of the second synchronizer SYN2 and operates the second clutch C2 and the fourth sleeve SL22 of the second synchronizer SYN2.

In this case, an input rotational speed input through the input pathway IP is reduced by an operation of the first brake B1 and the reduced rotational speed is output through the first intermediate output pathway MOP1.

In addition, the reduced rotational speed of the first intermediate output pathway MOP1 is input to the second shift portion T2 through the second variable input pathway VIP2 by an operation of the second clutch C2. The fourth sleeve SL22 of the second synchronizer SYN2 connects the second variable input pathway VIP2 to the fourth shift pathway D4, and the fourth forward speed F4 is achieved.

The fourth forward speed F4 is output through the third intermediate output pathway MOP3 and the final output pathway OP.

Fifth Forward Speed

If the vehicle speed increases in a state of the fourth forward speed F4, the transmission control unit TCU releases the second clutch C2, the first brake B1, and the fourth sleeve SL22 of the second synchronizer SYN2 and operates the first clutch C1, the third clutch C3, and the first sleeve SL11 of the first synchronizer SYN1.

In this case, the torque is input to the planet carrier PC through the first variable input pathway VIP1 by an operation of the first clutch C1, and the torque is input to the sun gear S through the input pathway IP. Therefore, all operating members of the first shift portion T1 become in the lock state and the same rotational speed as the input rotational speed is output through the first intermediate output pathway MOP1.

In addition, the same rotational speed of the first intermediate output pathway MOP1 is input to the second shift portion T2 through the third variable input pathway VIP3 by an operation of the third clutch C3. The first sleeve SL11 of the first synchronizer SYN1 connects the third variable input pathway VIP3 to the first shift pathway D1, and the fifth forward speed F5 is achieved.

The fifth forward speed F5 is output through the second intermediate output pathway MOP2 and the final output pathway OP.

Sixth Forward Speed

If the vehicle speed increases in a state of the fifth forward speed F5, the transmission control unit TCU releases the third clutch C3 and the first sleeve SL11 of the first synchronizer SYN12 and operates the second clutch C2 and the second sleeve SL12 of the first synchronizer SYN1.

In this case, the torque is input to the planet carrier PC through the first variable input pathway VIP1 by an operation of the first clutch C1, and the torque is input to the sun gear S through the input pathway IP. Therefore, all operating members of the first shift portion T1 become in the lock state and the same rotational speed as the input rotational speed is output through the first intermediate output pathway MOP1.

In addition, the same rotational speed of the first intermediate output pathway MOP1 is input to the second shift portion T2 through the second variable input pathway VIP2 by an operation of the second clutch C2. The second sleeve SL12 of the first synchronizer SNY1 connects the second variable input pathway VIP2 to the second shift pathway D2, and the sixth forward speed F6 is achieved.

The sixth forward speed F6 is output through the second intermediate output pathway MOP2 and the final output pathway OP.

Seventh Forward Speed

If the vehicle speed increases in a state of the sixth forward speed F6, the transmission control unit TCU releases the second clutch C2 and the second sleeve SL12 of the first synchronizer SYN1 and operates the third clutch C3 and the third sleeve SL21 of the second synchronizer SYN2.

In this case, the torque is input to the planet carrier PC through the first variable input pathway VIP1 by an operation of the first clutch C1, and the torque is input to the sun gear S through the input pathway IP. Therefore, all operating members of the first shift portion T1 become in the lock state and the same rotational speed as the input rotational speed is output through the first intermediate output pathway MOP1.

In addition, the same rotational speed of the first intermediate output pathway MOP1 is input to the second shift portion T2 through the third variable input pathway VIP3 by an operation of the third clutch C3. The third sleeve SL21 of the second synchronizer SYN2 connects the third variable input pathway VIP3 to the third shift pathway D3, and the seventh forward speed F7 is achieved.

The seventh forward speed F7 is output through the third intermediate output pathway MOP3 and the final output pathway OP.

Eighth Forward Speed

If the vehicle speed increases in a state of the seventh forward speed F7, the transmission control unit TCU releases the third clutch C3 and the third sleeve SL21 of the second synchronizer SYN2 and operates the second clutch C2 and the fourth sleeve SL22 of the second synchronizer SYN2.

In this case, the torque is input to the planet carrier PC through the first variable input pathway VIP1 by an operation of the first clutch C1, and the torque is input to the sun gear S through the input pathway IP. Therefore, all operating members of the first shift portion T1 become in the lock state and the same rotational speed as the input rotational speed is output through the first intermediate output pathway MOP1.

In addition, the same rotational speed of the first intermediate output pathway MOP1 is input to the second shift portion T2 through the second variable input pathway VIP2 by an operation of the second clutch C2. The fourth sleeve SL22 of the second synchronizer SYN2 connects the second variable input pathway VIP2 to the fourth shift pathway D4, and the eighth forward speed F8 is achieved.

The eighth forward speed F8 is output through the third intermediate output pathway MOP3 and the final output pathway OP.

First Reverse Speed

At the first reverse speed REV1, the transmission control unit TCU operates the second clutch C2, the first brake B1, and the third synchronizer SYN3.

In this case, an input rotational speed input through the input pathway IP is reduced by an operation of the first brake B1 and the reduced rotational speed is output through the first intermediate output pathway MOP1.

In addition, the reduced rotational speed of the first intermediate output pathway MOP1 is input to the second shift portion T2 through the second variable input pathway VIP2 by an operation of the second clutch C2. The fifth sleeve 34 of the third synchronizer SYN3 connects the second variable input pathway VIP2 to the reverse shift pathway R1, and the first reverse speed REV1 is achieved.

The first reverse speed REV1 is output through the second intermediate output pathway MOP2 and the final output pathway OP.

Second Reverse Speed

If the vehicle speed increases in a state of the first reverse speed R1, the transmission control unit TCU releases the first brake B1 and operates the first clutch C1.

In this case, the torque is input to the planet carrier PC through the first variable input pathway VIP1 by an operation of the first clutch C1, and the torque is input to the sun gear S through the input pathway IP. Therefore, all operating members of the first shift portion T1 become in the lock state and the same rotational speed as the input rotational speed is output through the first intermediate output pathway MOP1.

In addition, the same rotational speed of the first intermediate output pathway MOP1 is input to the second shift portion T2 through the second variable input pathway VIP2 by an operation of the second clutch C2. The fifth sleeve 34 of the third synchronizer SYN3 connects the second variable input pathway VIP2 to the reverse shift pathway R1, and the second reverse speed REV2 is achieved.

The second reverse speed REV2 is output through the second intermediate output pathway MOP2 and the final output pathway OP.

Compared with a conventional automatic transmission, structure may be simplified by removal of a torque converter, weight and manufacturing cost may be reduced, and, particularly, fuel mileage may improve because of enhancement of power delivery efficiency according to the present invention.

Since all frictional members are disposed at the exterior portion of the first shift portion, length of the transmission is shortened. Thus, the transmission can be mounted in an FF-vehicle. Since centrifugal pressure is increased, capacity of a hydraulic pump is reduced and emission of frictional heat may be enhanced.

Since eight forward speeds and two reverse speeds can be achieved by means of a simple structure, the transmission may be applied to passenger vehicles and diesel vehicles of high-load and high-capacity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic transmission for vehicles comprising:
a first shift portion outputting two intermediate rotational speeds of a reduced rotational speed and a same rotational speed as an input rotational speed by using torque received through a first variable input pathway selectively connected to a first input shaft and an input pathway fixedly connected to the first input shaft; and
a second shift portion comprising first, second, third, and fourth gears and a reverse gear that respectively achieve first, second, third, and fourth gear ratios and a reverse gear ratio, changing each intermediate rotational speed received from the first shift portion into five final rotational speeds, and outputting the same;
wherein the first shift portion comprises first, second, and third operating members, and
wherein the first operating member receives the torque through the input pathway fixedly connected to the first input shaft,
the second operating member is selectively stopped, and
the third operating member receives the torque through the first variable input pathway selectively connected to the first input shaft and always operates as an output member.

2. The automatic transmission for vehicles of claim 1, wherein the first shift portion is a planetary gear set provided with a sun gear, a planet carrier, and a ring gear as operating members thereof, and wherein the sun gear is operated as the first operating member, the ring gear is operated as the second operating member, and the planet carrier is operated as the third operating member.

3. The automatic transmission for vehicles of claim 1, wherein the first shift portion further comprises:
a first clutch selectively transmitting the torque to the third operating member through the first variable input pathway; and
a first brake selectively stopping the second operating member.

4. The automatic transmission for vehicles of claim 1, wherein the intermediate rotational speeds of the first shift portion are selectively transmitted to the second shift portion through second and third variable input pathways.

5. The automatic transmission for vehicles of claim 4, wherein the second shift portion comprises:
a second input shaft receiving the intermediate rotational speeds of the first shift portion through the second variable input pathway;
a third input shaft disposed concentrically with the second input shaft, and receiving the intermediate rotational speeds of the first shift portion through the third variable input pathway;
a first intermediate shaft disposed in parallel with the second and third input shafts, and selectively connected to the second and third input shafts so as to achieve the first and second gear ratios; and
a second intermediate shaft disposed in parallel with the second and third input shafts, and selectively connected to the second and third input shafts so as to achieve the third and fourth gear ratios.

6. The automatic transmission for vehicles of claim 5, wherein one of the first and second intermediate shafts is selectively connected to the second input shaft so as to achieve the reverse gear ratio.

7. The automatic transmission for vehicles of claim 5, wherein a first synchronizer provided with the first and second gears is disposed on the first intermediate shaft, and a second synchronizer provided with the third and fourth gears is disposed on the second intermediate shaft.

8. The automatic transmission for vehicles of claim 6, wherein a third synchronizer provided with the reverse gear is disposed on one of the first and second intermediate shafts.

9. The automatic transmission for vehicles of claim 7, wherein the third input shaft is provided with a first input gear integrally formed thereto, and the second input shaft is provided with a second input gear integrally formed thereto, and wherein the first input gear is engaged with the first and third gears, and the second input gear is engaged with the second and fourth gears.

10. The automatic transmission for vehicles of claim 8, wherein the second shift portion further comprises an idle gear, and the second input shaft further comprises a third input gear integrally formed thereto, and
wherein the idle gear is engaged with the third input gear and the reverse gear.

11. The automatic transmission for vehicles of claim 9, wherein the first synchronizer comprises:
a first sleeve selectively connecting the first gear with the first intermediate shaft; and
a second sleeve selectively connecting the second gear with the first intermediate shaft.

12. The automatic transmission for vehicles of claim 9, wherein the second synchronizer comprises:
a third sleeve selectively connecting the third gear with the second intermediate shaft; and
a fourth sleeve selectively connecting the fourth gear with the second intermediate shaft.

13. The automatic transmission for vehicles of claim 10, wherein the third synchronizer selectively connects the reverse gear with one of the first and second intermediate shafts.

14. The automatic transmission for vehicles of claim 5, wherein the second shift portion further comprises:
a first transfer drive gear integrally formed with the first intermediate shaft;
a second transfer drive gear integrally formed with the second intermediate shaft; and
a transfer driven gear engaged with the first and second transfer drive gears and outputting a final rotational speed.

15. The automatic transmission for vehicles of claim 4, further comprising:
a second clutch selectively transmitting the intermediate rotational speed of the first shift portion to the second shift portion through the second variable input pathway; and
a third clutch selectively transmitting the intermediate rotational speed of the first shift portion to the second shift portion through the third variable input pathway.

16. The automatic transmission for vehicles of claim 15, wherein the first, second, and third clutches, and the first brake are disposed at an exterior portion of the first shift portion.

* * * * *